(12) United States Patent
Dinerstein

(10) Patent No.: US 10,581,887 B1
(45) Date of Patent: Mar. 3, 2020

(54) EMPLOYING A RELATIVELY SIMPLE MACHINE LEARNING CLASSIFIER TO EXPLAIN EVIDENCE THAT LED TO A SECURITY ACTION DECISION BY A RELATIVELY COMPLEX MACHINE LEARNING CLASSIFIER

(71) Applicant: CA, Inc., San Jose, CA (US)

(72) Inventor: Jonathan J. Dinerstein, Draper, UT (US)

(73) Assignee: CA, Inc., San Jose, CA (US)

( * ) Notice: Subject to any disclaimer, the term of this patent is extended or adjusted under 35 U.S.C. 154(b) by 122 days.

(21) Appl. No.: 15/609,659

(22) Filed: May 31, 2017

(51) Int. Cl.
*G06F 7/04* (2006.01)
*H04L 29/06* (2006.01)
*G06N 3/08* (2006.01)
*G06F 17/30* (2006.01)

(52) U.S. Cl.
CPC .......... *H04L 63/1425* (2013.01); *G06N 3/08* (2013.01); *H04L 63/1441* (2013.01)

(58) Field of Classification Search
CPC . H04L 63/14; H04L 63/1408; H04L 63/1416; H04L 63/1441; H04L 63/145; H04L 63/1483; H04L 63/168
USPC ...................................................... 726/22, 23
See application file for complete search history.

(56) References Cited

U.S. PATENT DOCUMENTS 9,356,941 B1 * 5/2016 Kislyuk ................. H04L 63/14
10,250,617 B1 * 4/2019 Gardner .................. G06N 3/08
2005/0021980 A1 * 1/2005 Kanai ................... G06F 21/608
   713/182
2008/0319932 A1 * 12/2008 Yih ....................... G06K 9/6256
   706/20
2013/0139261 A1 * 5/2013 Friedrichs ............... G06F 21/00
   726/23
2013/0247187 A1 * 9/2013 Hsiao .................... G06F 21/552
   726/22
2014/0090061 A1 * 3/2014 Avasarala ............... G06F 21/56
   726/24

(Continued)

OTHER PUBLICATIONS

Marco Tulio Ribeiro et al., ""Why Should I Trust you?" Explaining the Predictions of any Classifier", version 3, Aug. 9, 2016, 10 pgs.

(Continued)

*Primary Examiner* — Gary S Gracia
(74) *Attorney, Agent, or Firm* — Maschoff Brennan (57) ABSTRACT

Employing a relatively simple machine learning classifier to explain evidence that led to a security action decision by a relatively complex machine learning classifier. In one embodiment, a method may include identifying training data, training a relatively complex machine learning classifier (MLC) using the training data, making a first security action decision using the relatively complex MLC, performing a security action on a network device based on the first security action decision, training a relatively simple MLC using the training data or using a subset of the training data, making a second security action decision using the relatively simple MLC, extracting evidence that led to the second security action decision by the relatively simple MLC, and explaining the first security action decision by the relatively complex MLC using the evidence extracted from the relatively simple MLC.

16 Claims, 5 Drawing Sheets

(56) References Cited

U.S. PATENT DOCUMENTS

| | | | | |
|---|---|---|---|---|
| 2015/0193696 A1* | 7/2015 | Vasseur | ............... | H04L 43/0876 |
| | | | | 706/12 |
| 2015/0200962 A1* | 7/2015 | Xu | ........................ | G06F 21/562 |
| | | | | 726/23 |
| 2015/0334125 A1* | 11/2015 | Bartos | ................. | H04L 63/1416 |
| | | | | 726/24 |
| 2016/0217390 A1* | 7/2016 | Shoaib | .................... | G06N 20/00 |
| 2016/0335432 A1* | 11/2016 | Vatamanu | .............. | G06F 21/552 |
| 2017/0201810 A1* | 7/2017 | Anderson | ................ | H04Q 9/02 |

OTHER PUBLICATIONS

Ryan Turner, Northrop Grumman Corporation, "A Model Explanation System" Sep. 2016, 5 pgs.

David Baehrens et al., "How to Explain Individual Classification Decisions", Journal of Machine Learning Research, Jun. 2010, 29 pgs.

Mark W. Craven et al., "Extracting Tree-Structured Representations of Trained Networks", Advances in Neural Information Processing Systems, vol. 8, 1996, 7 pgs.

* cited by examiner

EMPLOYING A RELATIVELY SIMPLE MACHINE LEARNING CLASSIFIER TO EXPLAIN EVIDENCE THAT LED TO A SECURITY ACTION DECISION BY A RELATIVELY COMPLEX MACHINE LEARNING CLASSIFIER

BACKGROUND

Many modern organizations employ security applications to deal with security issues on an organizational and technical level. For example, security applications may be employed to supervise, among other things, the organization's network and network devices to monitor for, investigate, and defend against potential threats. For example, a security application may be tasked with monitoring network devices and then alerting network administrators each time that a network device is threatened, such as by a virus or by malware.

Unfortunately, however, the task of monitoring a network for every potential threat can be very difficult in modern network environments. This difficulty may arise due to the relatively high number of network devices on modern networks and the relatively high number of potentially threatening circumstances that may arise on any given day on the network devices. Further, when a security application identifies a potential threat to a network device and then makes a security decision to mitigate the potential threat, it can be difficult to explain to a user of the network device why the security application made the security decision that it made due to the highly complex nature of the process employed by the security applications in making decisions. When a user is not given a satisfactory explanation why a particular security decision for a network device was made by a security application, the user may become skeptical that the security application is making sound security decisions, and may decide to circumvent the security application, thereby opening up the network device and the corresponding network to additional threats.

For example, when a security application identifies a website as a potentially virus-infected website and makes a security decision to block the website from being visited on a network device, it may be difficult for the security application to adequately explain to the user of the network device why the website was blocked. If the user is not given a satisfactory explanation why the security application blocked the website, the user may become skeptical of the security application and decide to disable the security application in order to visit the blocked website, thereby opening up the network device to the potentially virus-infected website.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for employing a relatively simple machine learning classifier to explain evidence that led to a security action decision by a relatively complex machine learning classifier may be performed, at least in part, by a computing device including at least one processor. The method may include identifying training data, training a relatively complex machine learning classifier (MLC) using the training data, making a first security action decision using the relatively complex MLC, performing a security action on a network device based on the first security action decision, training a relatively simple MLC using the training data or using a subset of the training data, making a second security action decision using the relatively simple MLC, extracting evidence that led to the second security action decision by the relatively simple MLC, and explaining the first security action decision by the relatively complex MLC using the evidence extracted from the relatively simple MLC.

In some embodiments, the making of the first security action decision may include making a decision that a website is likely malicious and the performing of the security action may include blocking the network device from having access to the website. In some embodiments, the making of the first security action decision may include making a decision that the network device is infected with an application that is likely malicious and the performing of the security action may include at least partially blocking the network device from having access to a network. In some embodiments, the making of the first security action decision may include making a decision that an extension application of a browser application of the network device is likely malicious and the performing of the security action may include at least partially blocking the extension application from sending data over a network. In some embodiments, the making of the first security action decision may include making a decision that an email on the network device is likely malicious, and the performing of the security action may include quarantining the email from being accessed by the network device.

Also, in some embodiments, the relatively complex MLC may include one or more of a Support Vector Machine, an Artificial Neural Network, and a Deep Learning Network. In some embodiments, the relatively simple MLC may include one or more of a Best-First Decision Tree, a C4.5 Tree, a Repeated Incremental Pruning to Produce Error Reduction (RIPPER), and a Fuzzy Unordered Rule Induction Algorithm (FURIA).

Further, in some embodiments, the subset of the training data may include fewer categories of training data and/or a simplified subset of the training data. In some embodiments, the extracting of the evidence that led to the second security action decision may include extracting relative priorities of different extracted evidences, with each of the different extracted evidences divided into categories of values, with the categories of values corresponding to human-readable adjectives, and with the explaining of the first security action decision including explaining the first security action decision using the human-readable adjectives.

Also, in some embodiments, one or more non-transitory computer-readable media may include one or more computer-readable instructions that, when executed by one or more processors, cause the one or more processors to perform a method for employing a relatively simple MLC to explain evidence that led to a security action decision by a relatively complex machine learning classifier.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Some embodiments in this disclosure relate to employing a relatively simple machine learning classifier (MLC) to explain evidence that led to a security action decision by a relatively complex machine learning classifier.

Security applications may be employed to monitor for, investigate, and defend from potential threats against network devices. When a security application identifies a potential threat to a network device and makes a security decision, it can be difficult to explain to a user of the network device why the security application made the security decision it did due to the highly complex nature of the process employed by the security application in making decisions. For example, a security application may employ an MLC that is trained on training data to enable the MLC to identify potential threats to a network device and make security decisions. However, it may be difficult for the security application to explain to the user of the network device why the MLC made the decision it did, in part because it may be difficult for a human to understand the complex and sophisticated MLC. When a user is not given a satisfactory explanation why a security decision for a network device was made by an MLC of a security application, the user may become skeptical that the "black box" security application is making sound security decisions and may decide to circumvent the security application, thereby opening up the network device and the corresponding network to additional threats.

For example, a security application may employ an MLC to identify a website as a potentially virus-infected website and then make a security decision to block the website from being visited on the network device. If the user is not given a satisfactory explanation why the MLC of the security application blocked the website, the user may become skeptical that the website being blocked by the security application is actually virus-infected or otherwise malicious, and the user may decide to disable the security application in order to visit the blocked website, thereby opening up the network device to the potentially virus-infected website.

The embodiments disclosed herein may provide various benefits. In particular, the embodiments disclosed herein may, for example, employ a relatively simple MLC to explain evidence that led to a security action decision by a relatively complex MLC.

In some embodiments, employing a relatively simple MLC to explain evidence that led to a security action decision by a relatively complex MLC may enable a security application to help a user understand why the security action decision was made and/or convince the user that the security action decision that was made was a sound decision. In some embodiments, the relatively simple MLC may be trained on the same training data, or on a subset of the same training data, as the relatively complex MLC, which may enable both classifiers to make the same or similar security action decisions. In some embodiments, the relatively more complex nature of the relatively complex MLC may enable the relatively complex MLC to make highly-reliable yet relatively complex security action decisions while the relatively simple nature of the relatively simple MLC may enable the relatively simple MLC to make relatively simple security action decisions that are more easily explained to users.

For example, in some embodiments, a security application may employ a relatively complex MLC to identify a website as a potentially virus-infected website and then make a security decision to block the website from being visited on the network device. The security application may then employ a relatively simple MLC to explain evidence that led to the security action decision to block the website. This evidence may include, for example, evidence that the website is a relatively new website, the website has low traffic, and the website is hosted in a country known for hosting malicious websites. By explaining this evidence to the user, the user may be more likely to be satisfied with the security application blocking the website and the user may avoid circumventing the blocking of the website, thus avoiding the network device of the user, and the associated network, from being negatively impacted by the potentially virus-infected website.

Figure 1:
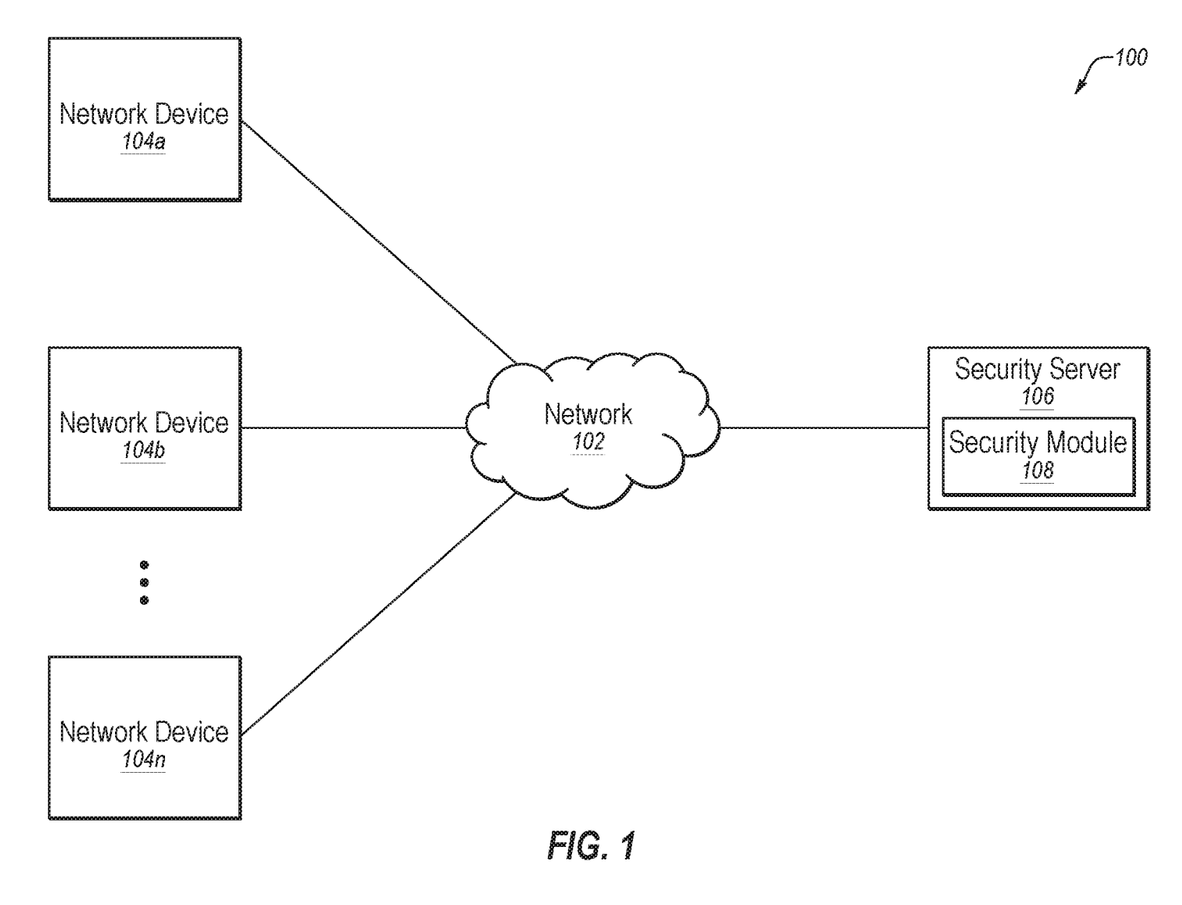
FIG. 1 illustrates an example system configured for employing a relatively simple machine learning classifier to explain evidence that led to a security action decision by a relatively complex machine learning classifier.

Turning to the figures, FIG. 1 illustrates an example system 100 configured for employing a relatively simple machine learning classifier to explain evidence that led to a security action decision by a relatively complex machine learning classifier. The system 100 may include a network 102, network devices 104a-104n, and a security server 106.

In some embodiments, the network 102 may be configured to communicatively couple the network devices 104a-104n to one another as well as to the security server 106. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
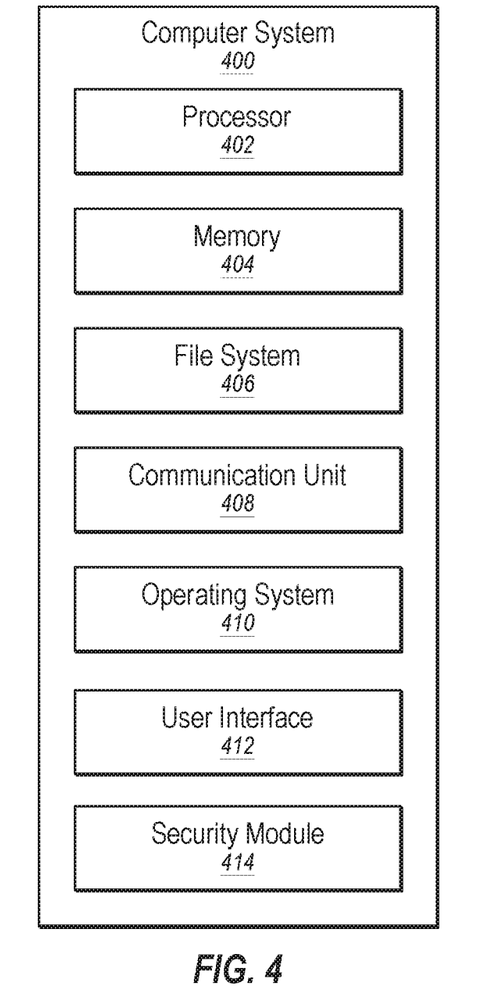
FIG. 4 illustrates an example computer system that may employ a relatively simple machine learning classifier to explain evidence that led to a security action decision by a relatively complex machine learning classifier.

In some embodiments, each of the network devices 104a-104n may be any computer system capable of communicating over the network 102, examples of which are disclosed herein in connection with the computer system 400 of FIG. 4.

In some embodiments, the security server 106 may be any computer system capable of communicating over the network 102 and capable of monitoring the network devices 104a-104n, examples of which are disclosed herein in connection with the computer system 400 of FIG. 4. In some embodiments, the security server 106 may be employed by an organization that manages the network 102 and the network devices 104a-104n. In some embodiments, the security server 106 may include a security module 108 that may be configured to identify potential threats to the network 102 and/or the network devices 104a-104n and make security action decisions, as disclosed in greater detail in connection with FIGS. 2A-2B and 3 herein. In some embodiments, the security module 108 may include, or have access to, training data and/or machine learning classifiers. In some embodiments, the security module 108 may include, or be part of, a User Behavior Analytics (UBA) application and/or a Security Information and Event Management (SIEM) application.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2A:
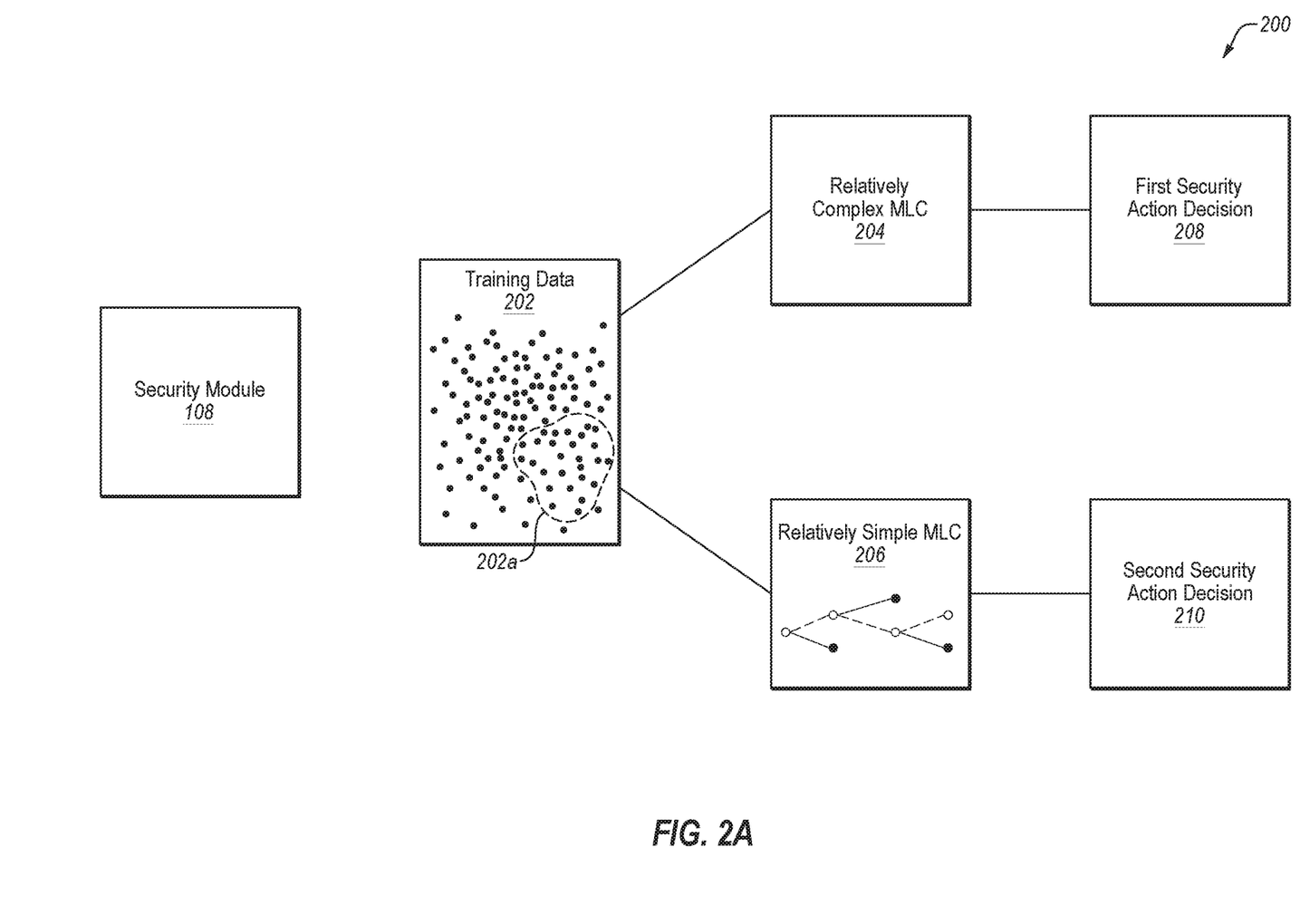
FIG. 2A is a flowchart of example training and predicting using a relatively complex machine learning classifier and using a relatively simple machine learning classifier.

FIG. 2A is a flowchart 200 of example training and predicting using a relatively complex MLC 204 and using a relatively simple MLC 206. As disclosed in FIG. 2, the security module 108 may train the relatively complex MLC 204 and the relatively simple MLC 206 using the training data 202. In some embodiments, the relatively complex MLC 204 may include one or more of a Support Vector Machine, an Artificial Neural Network, and a Deep Learning Network. In some embodiments, the relatively simple MLC 206 may include one or more of a Best-First Decision Tree, a C4.5 Tree, a Repeated Incremental Pruning to Produce Error Reduction (RIPPER), and a Fuzzy Unordered Rule Induction Algorithm (FURIA).

In some embodiments, the training data 202 may include positive and negative samples of network devices. The positive samples in the training data 202 may be collected from network devices that have been confirmed to have been compromised. In contrast, the negative samples in the training data 202 may be collected from network devices that have been confirmed to have not been compromised. In some embodiments, the training data 202 may additionally or alternatively include samples of network devices that are not labeled as either positive or negative, such as where the samples are collected from network devices that have not been confirmed to have been compromised or to not have been compromised. In some embodiments, a compromised network device is a network device that has been infected with a malicious application. A malicious application may include, but is not limited to, one or more of a spyware, a virus, a worm, a logic bomb, a trapdoor, a Trojan horse, a Remote Admin Trojan (RAT), a malware, a mobile malicious code, a malicious font, and a rootkit.

In some embodiments, the security module 108 may train the relatively complex MLC 204 using the training data 202, while the security module 108 also trains the relatively simple MLC 206 using the same training data 202. Alternatively, in some embodiments, the security module 108 may instead train the relatively simple MLC 206 using a subset 202a of the training data 202. The subset 202a of the training data 202 may include fewer categories of training data and/or be a simplified subset of the training data 202. Fewer categories of training data and/or simplified training data may avoid employing training data with unhelpful categories and/or overly-complex training data that may not be helpful in explaining a security action decision made by the relatively simple MLC 206.

Once the security module 108 has trained the relatively complex MLC 204 on the training data 202, the security module 108 may employ the relatively complex MLC 204 to make a first security action decision 208. Similarly, once the security module 108 has trained the relatively simple MLC 206 on the training data 202, the security module 108 may employ the relatively simple MLC 206 to make a second security action decision 210. In some embodiments, the first security action decision 208 and the second security action decision 210 may be the same, while in other embodiments these two decisions may differ to some degree. In either case, however, the relatively simple MLC 206 may extract evidence that led to the second security action decision 210 in order to explain the first security action decision 208.

Figure 2B:
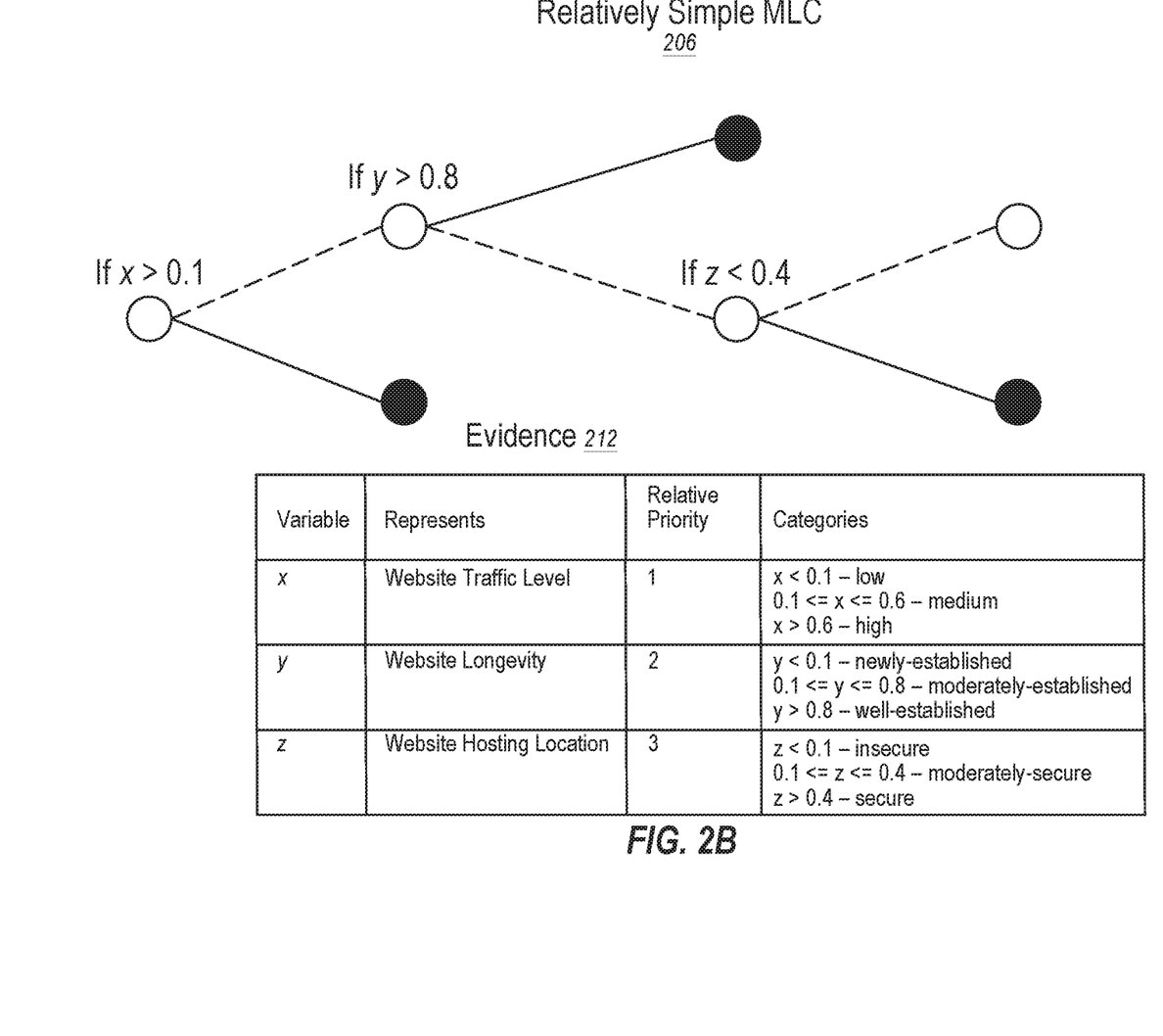
FIG. 2B illustrates the relatively simple machine learning classifier of FIG. 2A and evidence extracted by the relatively simple machine learning classifier.

FIG. 2B illustrates the relatively simple MLC 206 of FIG. 2A and evidence 212 extracted by the relatively simple MLC 206. As disclosed in FIG. 2B, the relatively simple MLC 206 is illustrated as a Best-First Decision Tree.

The relatively simple MLC 206 may be trained and employed to make a security action decision, such as whether to block a website. After the relatively simple MLC 206 has decided whether to block a website, the relatively simple MLC 206 may extract the evidence 212 that led to the decision by the relatively simple MLC 206 to block or not block the website. For example, the relatively simple MLC 206 may have relied, at least in part, on three variables x, y, and z, which represent website traffic level, website longevity, and website hosting location, respectively. These variables may have a priority, such that the variable with a higher priority (e.g., x with a priority of 1) may be relied on more heavily than the variable with a lower priority (e.g., z with a priority of 3).

Further, the values of each variable (which may be between 0 and 1 for example) of the evidence 212 may correspond to certain categories. For example, a value of $x<0.1$ may correspond to a low website traffic level, a value of $0.1<=x<=0.6$ may correspond to a medium website traffic level, and a value of $x>0.6$ may correspond to a high website traffic level. Also, a value of $y<0.1$ may correspond to a newly-established website, a value of $0.1<=y<=0.8$ may correspond to a moderately-established website, and a value of $y>0.8$ may correspond to a well-established website. Further, a value of $z<0.1$ may correspond to an insecure website hosting location, a value of $0.1<=z<=0.4$ may correspond to a moderately-secure website hosting location, and a value of $z>0.4$ may correspond to a secure website hosting location. In some embodiments, these categories of the variables of the evidence 212 may be employed by the security module 108 of FIG. 2A in generating an explanation for the first security action decision 208 by the relatively complex MLC 204.

Modifications, additions, or omissions may be made to the example training and predicting in the flowchart 200 of FIGS. 2A-2B without departing from the scope of the present disclosure. For example, in some embodiments, a type of relatively simple MLC other than a Best-First Decision Tree may be employed as the relatively simple MLC 206. Further, in some embodiments, a security action decision other than whether to block a website may be made by the relatively simple MLC 206, such as a decision whether a network device is infected with an application that is likely malicious, whether an extension application of a browser application of a network device is likely malicious, or whether an email on a network device is likely malicious.

Figure 3:
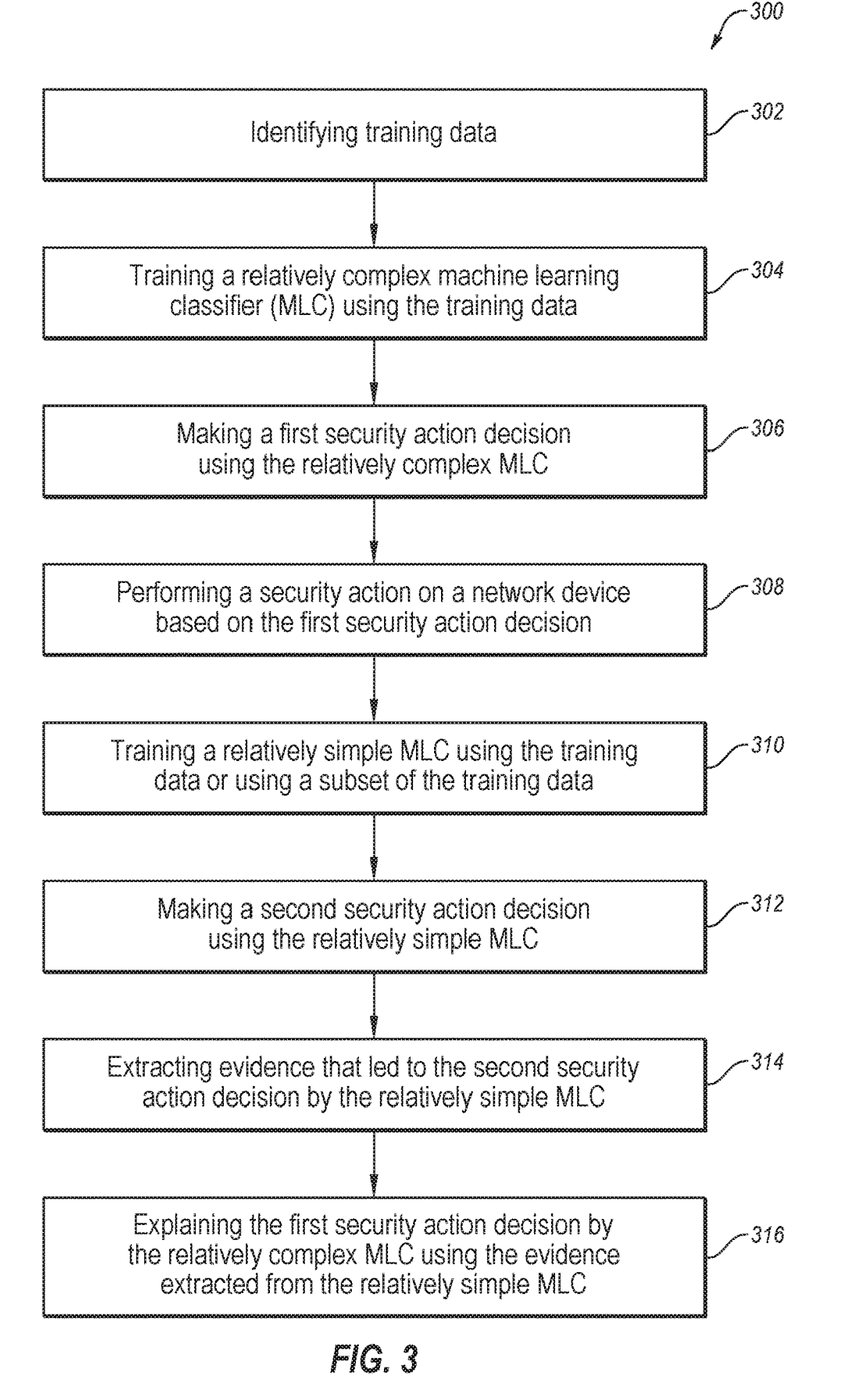
FIG. 3 is a flowchart of an example method for employing a relatively simple machine learning classifier to explain evidence that led to a security action decision by a relatively complex machine learning classifier.

FIG. 3 is a flowchart of an example method for employing a relatively simple MLC to explain evidence that led to a security action decision by a relatively complex machine learning classifier. The method 300 may be performed, in some embodiments, by a device or system, such as by the security module 108 executing on the security server 106 of FIG. 1. In these and other embodiments, the method 300 may be performed by one or more processors based on one or more computer-readable instructions stored on one or more non-transitory computer-readable media. The method 300 will now be described in connection with FIGS. 1, 2A-2B, and 3.

The method 300 may include, at block 302, identifying training data. For example, the security module 108 may identify, at block 302, the training data 202.

The method 300 may include, at block 304, training a relatively complex MLC using the training data. For example, the security module 108 may train, at block 304, the relatively complex MLC 204 using the training data 202.

The method 300 may include, at block 306, making a first security action decision using the relatively complex MLC. For example, the security module 108 may make, at block 306, the first security action decision 208 using the relatively complex MLC 204.

The method 300 may include, at block 308, performing a security action on a network device based on the first security action decision. For example, the security module 108 may perform, at block 308, a security action on the network device 104a based on the first security action decision 208.

In some embodiments, the making, at block 306, of the first security action decision may include making a decision that a website is likely malicious and the performing, at block 308, of the security action may include blocking the network device from having access to the website. For example, the security module 108 may make, at block 306, a decision that a website is likely malicious using the relatively complex MLC 204 and then block, at block 308, the network device 104a from having access to the website.

In some embodiments, the making, at block 306, of the first security action decision may include making a decision that the network device is infected with an application that is likely malicious and the performing, at block 308, of the security action may include at least partially blocking the network device from having access to a network. For example, the security module 108 may make, at block 306, a decision that the network device 104a is infected with an application that is likely malicious using the relatively complex MLC 204 and then at least partially block, at block 308, the network device 104a from having access to the network 102.

In some embodiments, the making, at block 306, of the first security action decision may include making a decision that an extension application of a browser application of the network device is likely malicious and the performing, at block 308, of the security action may include at least partially blocking the extension application from sending data over a network. For example, the security module 108 may make, at block 306, a decision that an extension application of a browser application of the network device 104a is likely malicious using the relatively complex MLC 204 and then at least partially block, at block 308, the extension application from sending data over the network 102.

In some embodiments, the making, at block 306, of the first security action decision may include making a decision that an email on the network device is likely malicious, and the performing, at block 308, of the security action may include quarantining the email from being accessed by the network device. For example, the security module 108 may make, at block 306, a decision that an email on the network device 104a is likely malicious using the relatively complex MLC 204 and then quarantine, at block 308, the email from being accessed by the network device 104a.

The method 300 may include, at block 310, training a relatively simple MLC using the training data or using a subset of the training data. For example, the security module 108 may train, at block 310, the relatively simple MLC 206 using the training data 202 or using a subset 202a of the training data 202.

In some embodiments, the subset of the training data may include fewer categories of training data and/or a simplified subset of the training data. For example, the subset 202a of the training data 202 may include fewer categories of training data and/or a simplified subset of the training data.

The method 300 may include, at block 312, making a second security action decision using the relatively simple MLC. For example, the security module 108 may make, at block 312, the second security action decision 210 using the relatively simple MLC 206.

The method 300 may include, at block 314, extracting evidence that led to the second security action decision by the relatively simple MLC. For example, the security module 108 may extract, at block 314, evidence 212 that led to the second security action decision 210 by the relatively simple MLC 206.

In some embodiments, the extracting, at block 314, of the evidence that led to the second security action decision may include extracting relative priorities of different extracted evidences. For example, the security module 108 may extract, at block 314, relative priorities of 1, 2, and 3 for the different extracted evidences 212 represented by the variables x, y, and z, respectively.

The method 300 may include, at block 316, explaining the first security action decision by the relatively complex MLC using the evidence extracted from the relatively simple MLC. For example, the security module 108 may explain, at block 316, the first security action decision 208 by the relatively complex MLC 204 using the evidence 212 extracted from the relatively simple MLC 206.

In some embodiments, each of the different extracted evidences may be divided into categories of values, with the categories of values corresponding to human-readable adjectives, and with the explaining of the first security action decision including explaining the first security action decision using the human-readable adjectives. For example, the categories of values listed for the extracted evidences 212 represented by x, y, and z may correspond to the human-readable adjectives (1) "low," "medium," and "high," (2) "newly-established," "moderately-established," and "well-established," and (3) "insecure," "moderately-secure," and "secure," respectively. Then, the security module 108 may explain, at block 316, the first security action decision 208 using these human-readable adjectives, such as describing why a website was blocked as follows: "The website was blocked because the website traffic level was only medium, the website longevity was not well-established, and the website hosting location was not secure."

Thus, in some embodiments, the method 300 may employ the relatively simple MLC 206 to explain evidence that led to the first security action decision 208 by the relatively complex MLC 204. In so doing, the method 300 may enable a security application to help a user understand why the first security action decision 208 was made and/or convince the user that the first security action decision 208 that was made was a sound decision. In some embodiments, the relatively more complex nature of the relatively complex MLC 204 may enable the relatively complex MLC 204 to make the highly-reliable yet relatively complex first security action decision 208 while the relatively simple nature of the relatively simple MLC 206 may enable the relatively simple MLC 206 to make the relatively simple second security action decision 210 that is more easily explained to a user.

Although the blocks of the method 300 are illustrated in FIG. 3 as discrete blocks, various blocks may be divided into additional blocks, combined into fewer blocks, reordered, expanded, or eliminated, depending on the desired implementation. For example, in some embodiments, blocks 310-316 may be performed without performing blocks 302-308. Also, in some embodiments, block 308 may be eliminated or may be performed by a network administrator or other entity that is different from the entity performing the other blocks of the method 300. Further, in some embodiments, blocks 302-308 may be performed in parallel with the performance of one or more of blocks 310-316.

Further, it is understood that the method 300 may improve the functioning of a network environment. For example, the functioning of the security server 106 or any of the network devices 104a-104n of FIG. 1 may itself be improved by the method 300. For example, any of these computer systems may be improved by employing the relatively simple MLC 206 to explain evidence that led to the first security action decision 208 by the relatively complex MLC 204, thus increasing the likelihood that a user will be satisfied with the first security action decision 208 and not decide to circumvent the first security action decision 208 leaving a network device and/or a network vulnerable to security threats. Further, unlike a conventional security application that employs only a relatively complex MLC, the method 300 employs a relatively complex MLC to make a highly reliable security action decision while also employing a relatively simple MLC in order to make a security action decision that is relatively simple to explain to a user.

Also, the method 300 may improve the technical field of detecting and securing compromised network devices. Employing both a relatively complex MLC to make a highly reliable security action decision, while also employing a relatively simple MLC in order to make a security action decision that is relatively simple to explain to a user, is an improvement over conventional attempts at explaining a security action decision using only a relatively complex MLC.

FIG. 4 illustrates an example computer system 400 that may employ a relatively simple MLC to explain evidence that led to a security action decision by a relatively complex MLC. In some embodiments, the computer system 400 may be part of any of the systems or devices described in this disclosure. For example, the computer system 400 may be part of any of the network devices or the security server devices of FIG. 1.

The computer system 400 may include a processor 402, a memory 404, a file system 406, a communication unit 408, an operating system 410, a user interface 412, and a security module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more blocks of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more blocks of the method 300 of FIG. 3. These computer-executable instructions may be included, for example, in the operating system 410, in one or more applications, such as the security module 414, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The security module 414 may be one or more computer-readable instructions stored on one or more non-transitory computer-readable media, such as the memory 404 or the file system 406, that, when executed by the processor 402, is configured to perform one or more blocks of the method 300 of FIG. 3. In some embodiments, the security module 414 may be part of the operating system 410 or may be part of an application of the computer system 400, or may be some combination thereof. In some embodiments, the security module 414 may function as the security module 108 of FIGS. 1 and 2A.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for employing a relatively simple machine learning classifier to explain evidence that led to a security action decision by a relatively complex machine learning classifier, at least a portion of the method being performed by a computing device comprising at least one processor, the method comprising:
   identifying training data;
   training a relatively complex machine learning classifier (MLC) using the training data;
   making a first security action decision using the relatively complex MLC, the first security action decision related to a potential security threat to a network device, the first security action decision comprising a decision that a network resource is likely malicious;
   performing a security action on the network device, to mitigate the potential security threat, based on the first security action decision, the security action comprising at least partially blocking the network device from accessing the network resource;
   training a relatively simple MLC using the training data;
   making a second security action decision using the relatively simple MLC, the second security action decision being the same as the first security action decision;
   extracting evidence values that led to the second security action decision by the relatively simple MLC, the extracting of the evidence values that led to the second security action decision comprising extracting relative priorities of different extracted evidence values, with the different extracted evidence values being divided into categories of values; and
   explaining, using human-readable words for a user, the first security action decision by the relatively complex MLC using the evidence values extracted from the relatively simple MLC.

2. The method of claim 1, wherein:
   the network resource comprises a website; and
   the at least partial blocking of the network device from accessing the network resource comprises blocking the network device from having access to the website.

3. The method of claim 1, wherein:
   the network resource comprises an application that is likely malicious; and
   the at least partial blocking of the network device from accessing the network resource comprises at least partially blocking the network device from having access to a network.

4. The method of claim 1, wherein:
   the network resource comprises an extension application of a browser application of the network device is likely malicious; and
   the at least partial blocking of the network device from accessing the network resource comprises at least partially blocking the extension application from sending data over a network.

5. The method of claim 1, wherein:
   the network resource comprises an email on the network device is likely malicious; and
   the at least partial blocking of the network device from accessing the network resource comprises quarantining the email from being accessed by the network device.

6. The method of claim 1, wherein the relatively complex MLC comprises one or more of a Support Vector Machine, an Artificial Neural Network, and a Deep Learning Network.

7. The method of claim 1, wherein the relatively simple MLC comprises one or more of a Best-First Decision Tree, a C4.5 Tree, a Repeated Incremental Pruning to Produce Error Reduction (RIPPER), and a Fuzzy Unordered Rule Induction Algorithm (FURIA).

8. A computer-implemented method for employing a relatively simple machine learning classifier to explain evidence that led to a security action decision by a relatively complex machine learning classifier, at least a portion of the method being performed by a computing device comprising at least one processor, the method comprising:
   identifying training data;
   training a relatively complex machine learning classifier (MLC) using the training data;
   making a first security action decision using the relatively complex MLC, the first security action decision related to a potential security threat to a network device, the first security action decision comprising a decision that a network resource is likely malicious;
   performing a security action on the network device, to mitigate the potential security threat, based on the first security action decision, the security action comprising at least partially blocking the network device from accessing the network resource;
   training a relatively simple MLC using a subset of the training data; making a second security action decision using the relatively simple MLC, the second security action decision being the same as the first security action decision;
   extracting evidence values that led to the second security action decision by the relatively simple MLC, the extracting of the evidence values that led to the second security action decision comprising extracting relative priorities of different extracted evidence values, with the different extracted evidence values being divided into categories of values; and
   explaining, using human-readable words for a user, the first security action decision by the relatively complex MLC using the evidence values extracted from the relatively simple MLC.

9. The method of claim 8, wherein the subset of the training data comprises fewer categories of training data.

10. The method of claim 8, wherein the subset of the training data comprises a simplified subset of the training data.

11. The method of claim 8, wherein the categories of values correspond to human-readable adjectives.

12. The method of claim 11, wherein the explaining of the first security action decision comprises explaining the first security action decision using the human-readable adjectives.

13. One or more non-transitory computer-readable media comprising one or more computer-readable instructions that, when executed by one or more processors of one or more computing devices, cause the one or more computing devices to perform a method comprising:
   identifying training data;
   training a relatively complex machine learning classifier (MLC) using the training data;
   making a first security action decision using the relatively complex MLC, the first security action decision related to a potential security threat to a network device, the first security action decision comprising a decision that a network resource is likely malicious;
   performing a security action on the network device, to mitigate the potential security threat, based on the first security action decision, the security action comprising at least partially blocking the network device from accessing the network resource;
   training a relatively simple MLC using the training data;

making a second security action decision using the relatively simple MLC, the second security action decision being the same as the first security action decision;

extracting evidence values that led to the second security action decision by the relatively simple MLC, the extracting of the evidence values that led to the second security action decision comprising extracting relative priorities of different extracted evidence values, with the different extracted evidence values being divided into categories of values; and explaining, using human-readable words for a user, the first security action decision by the relatively complex MLC using the evidence values extracted from the relatively simple MLC.

14. The one or more non-transitory computer-readable media of claim 13, wherein:

the network resource comprises one or more of a website, an application, an extension application of a browser application of the network device, and an email on the network device; and the at least partial blocking of the network device from accessing the network resource comprises blocking the network device from having access to the website, at least partially blocking the network device from having access to a network, at least partially blocking the extension application from sending data over a network, and quarantining the email from being accessed by the network device.

15. The one or more non-transitory computer-readable media of claim 13, wherein:

the relatively complex MLC comprises one or more of a Support Vector Machine, an Artificial Neural Network, and a Deep Learning Network; and the relatively simple MLC comprises one or more of a Best-First Decision Tree, a C4.5 Tree, a Repeated Incremental Pruning to Produce Error Reduction (RIPPER), and a Fuzzy Unordered Rule Induction Algorithm (FURIA).

16. The one or more non-transitory computer-readable media of claim 13, wherein:

the categories of values correspond to human-readable adjectives; and the explaining of the first security action decision comprises explaining the first security action decision using the human-readable adjectives.

* * * * *